United States Patent
Mermelstein et al.

(10) Patent No.: US 9,708,043 B2
(45) Date of Patent: Jul. 18, 2017

(54) PRESSURE HULL PENETRATOR FOR SUBMERSIBLE VEHICLES THAT UTILIZE FUEL CELLS

(71) Applicant: The Boeing Company, Chicago, IL (US)

(72) Inventors: Joshua M Mermelstein, Laguna Niguel, CA (US); Wayne A. Viloria, Chino Hills, CA (US)

(73) Assignee: The Boeing Company, Chicago, IL (US)

( * ) Notice: Subject to any disclaimer, the term of this patent is extended or adjusted under 35 U.S.C. 154(b) by 364 days.

(21) Appl. No.: 14/602,898

(22) Filed: Jan. 22, 2015

(65) Prior Publication Data

US 2017/0096205 A1   Apr. 6, 2017

(51) Int. Cl.
| | | |
|---|---|---|
| *B63G 8/00* | (2006.01) | |
| *B63B 3/13* | (2006.01) | |
| *B63B 17/00* | (2006.01) | |
| *B63H 21/00* | (2006.01) | |

(52) U.S. Cl.
CPC ............... *B63G 8/001* (2013.01); *B63B 3/13* (2013.01); *B63B 17/0027* (2013.01); *B63B 2770/00* (2013.01); *B63G 2008/002* (2013.01); *B63H 2021/003* (2013.01)

(58) Field of Classification Search
CPC ........ B63G 8/001; B63B 3/13; B63B 17/0027
See application file for complete search history.

(56) References Cited

U.S. PATENT DOCUMENTS

| 3,825,320 A * | 7/1974 | Redfern ............... G02B 6/4428 174/152 R |
|---|---|---|
| 4,329,540 A * | 5/1982 | Howarth .............. H01B 17/306 174/153 R |
| 4,469,399 A * | 9/1984 | Cowen ................. G02B 6/4428 385/138 |
| 5,515,465 A * | 5/1996 | Olin ..................... G02B 6/3897 174/70 S |
| 5,714,710 A * | 2/1998 | Roach ................ B65D 21/0201 102/282 |

(Continued)

FOREIGN PATENT DOCUMENTS

EP      2902311 A1   8/2015

*Primary Examiner* — Stephen Avila
(74) *Attorney, Agent, or Firm* — Duft Bornsen & Fettig LLP (57) ABSTRACT

Embodiments described herein provide for in-place refueling of reactant sources for submersible vehicles that utilize fuel cells. In one embodiment, the vehicle includes a pressure hull that maintains a pressure boundary between an interior surface and an exterior surface, and includes a fuel cell. The vehicle includes a reactant source tank for the fuel cell that includes a fill port for transferring a reactant source to the reactant source tank. The vehicle includes a pressure hull penetrator that traverses from the exterior surface to the interior surface utilizing a passage through the pressure hull. The pressure hull penetrator maintains the pressure boundary between the exterior surface and the interior surface. The vehicle includes a fill tube coupled to the fill port of the reactant source tank that traverses through the pressure hull penetrator to the exterior surface, and an electrically non-conductive sleeve surrounding the fill tube.

20 Claims, 11 Drawing Sheets

(56) References Cited

U.S. PATENT DOCUMENTS

| | | | | |
|---|---|---|---|---|
| 6,196,553 B1 * | 3/2001 | Arab-Sadeghabadi | | G02B 6/3816 |
| | | | | 174/77 R |
| 6,625,084 B1 * | 9/2003 | Payton | .................. | H04B 11/00 |
| | | | | 367/134 |
| 7,249,971 B2 * | 7/2007 | Burke | ............... | B29C 45/14639 |
| | | | | 439/589 |
| 8,919,273 B1 * | 12/2014 | Hoffman | ................. | B63B 13/00 |
| | | | | 114/312 |
| 2015/0219258 A1 * | 8/2015 | Ford | .................... | F16L 23/003 |
| | | | | 285/47 |

* cited by examiner

PRESSURE HULL PENETRATOR FOR SUBMERSIBLE VEHICLES THAT UTILIZE FUEL CELLS

FIELD

This disclosure relates to the field of submersible vehicles, and in particular, to refueling submersible vehicles that utilize fuel cells for electrical power generation.

BACKGROUND

Submersible vehicles (e.g., Unmanned Underwater Vehicles (UUVs)) sometimes utilize fuel cells to generate electricity. One example of a fuel cell is a Proton Exchange Membrane (PEM) fuel cell. Another example of a fuel cell is a Solid Oxide Fuel Cell (SOFC). Fuel cells operate by electrochemically converting a fuel (e.g., hydrogen) and oxygen into electricity. In order to promote a longer operating time for the fuel cell, it is desirable to utilize a dense source of hydrogen and oxygen. For example, the source of hydrogen may be kerosene, which can be reformed into hydrogen and used by the fuel as one of the reactants. The source of oxygen may be an oxidizer or liquefied oxygen, which is used by the fuel cell as one of the reactants. Both the fuel and the oxygen may be stored in reactant source tanks within the UUV, which are consumed during operation of the fuel cell and are refilled at some point.

To support operation at depth in the water, submersible vehicles include a pressure hull that protects the various internal systems from exposure to the high pressures found at depth. The pressure hull is designed to withstand a large pressure differential between the internal systems of the submersible vehicle and the external water pressure, which rises quickly under water. For instance, at a depth of 1000 meters, the pressure on a submersible vehicle can be over a hundred times higher than at the surface of the water. Thus, including penetrations through the pressure hull have to be carefully considered. Since failures in the pressure hull at depth will result in the loss of the submersible vehicle, it is often undertaken to disassemble portions of the pressure hull in order to replenish the reactant sources for the fuel cell rather than introduce possible points of failure in the pressure hull. This is time consuming and therefore, increases the delay before submersible vehicles that utilize fuel cells can be placed back into service. To address these and other issues, the present disclosure is submitted.

SUMMARY

Embodiments described herein provide for in-place refueling of reactant sources for submersible vehicles that utilize fuel cells. A penetrator that traverses a pressure hull is capable of withstanding the high pressure differentials that can occur across the pressure hull. The pressure hull penetrator further includes a feature that electrically isolates the reactant source tanks from the pressure hull. This ensures that the systems within the submersible vehicle are not damaged due to the voltages that may be induced onto the pressure hull during operation under water by the fuel cell system.

One embodiment is a vehicle that is configured to submerge in water. The vehicle includes a pressure hull that is configured to maintain a pressure boundary between an interior surface and an exterior surface. The vehicle further includes a fuel cell and a reactant source tank for the fuel cell within the interior surface. The reactant source tank includes a fill port for transferring a reactant source for the fuel cell to the reactant source tank. The vehicle further includes a pressure hull penetrator that traverses from the exterior surface to the interior surface utilizing a passage through the pressure hull. The pressure hull penetrator is configured to maintain the pressure boundary between the exterior surface and the interior surface. The vehicle further includes a fill tube coupled to the fill port of the reactant source tank that traverses through the pressure hull penetrator to the exterior surface. The vehicle further includes an electrically non-conductive sleeve surrounding the fill tube that is sandwiched between the fill tube and the pressure hull penetrator along the passage through the pressure hull.

Another embodiment is an apparatus that includes an electrically conductive pressure hull penetrator that traverses from an exterior surface of a pressure hull for a submersible vehicle to an interior surface of the pressure hull utilizing a passage through the pressure hull. The pressure hull penetrator includes a flange that removably couples the pressure hull penetrator to the pressure hull along a surface that mates to the exterior surface of the pressure hull. The apparatus further includes an electrically conductive fill tube coupled to a reactant source tank for a fuel cell that traverses through a centerline of the pressure hull penetrator to the exterior surface. The apparatus further includes an electrically non-conductive sleeve that is sandwiched between the fill tube and the pressure hull penetrator along the passage through the pressure hull. The apparatus further includes a radial seal sandwiched between the passage through the pressure hull and the pressure hull penetrator, and a face seal sandwiched between the surface of the flange and the exterior surface of the pressure hull.

Another embodiment is an apparatus that includes an electrically conductive pressure hull penetrator that traverses from an exterior surface of a pressure hull to an interior surface of the pressure hull utilizing a passage through the pressure hull. The pressure hull penetrator includes a mounting surface that removably couples the pressure hull penetrator to the pressure hull. The apparatus further includes an electrically conductive fill tube coupled to a storage tank that traverses through a centerline of the pressure hull penetrator to the exterior surface. The apparatus further includes an electrically non-conductive sleeve that is sandwiched between the fill tube and the pressure hull penetrator along the passage through the pressure hull. The apparatus further includes a radial seal sandwiched between the passage through the pressure hull and the pressure hull penetrator, and a face seal sandwiched between the mounting surface of the pressure hull penetrator and the exterior surface of the pressure hull.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
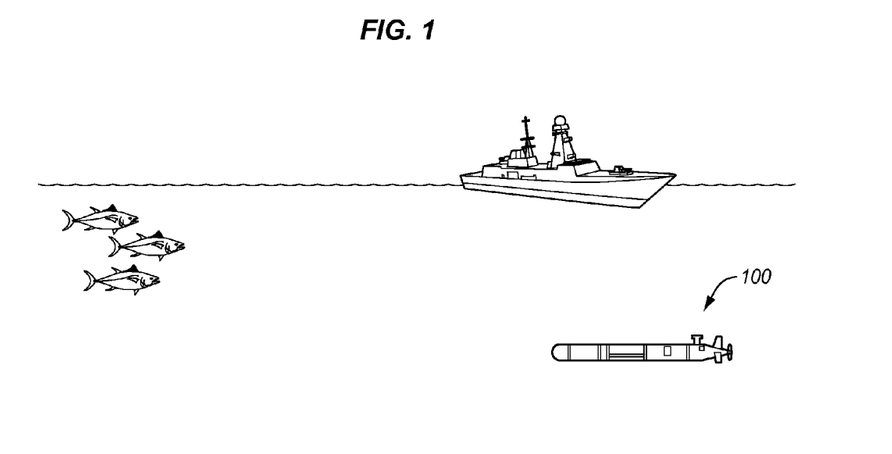
FIG. 1 illustrates a submersible vehicle that utilizes a pressure hull penetrator for refueling of a fuel cell in an exemplary embodiment.

FIG. 1 illustrates a submersible vehicle 100 that utilizes a pressure hull penetrator for refueling of a fuel cell in an exemplary embodiment. In this embodiment, vehicle 100 is depicted as an Unmanned Underwater Vehicle (UUV), although in other embodiments, vehicle 100 may be any type of vehicle that is able to submerge under water and utilize a fuel cell to generate electricity.

Vehicle 100 utilizes an onboard fuel cell that allows vehicle 100 to operate for long periods of time without surfacing. Typically, underwater vehicles utilize nuclear power sources or batteries to provide electrical power to the vehicle. However, in this embodiment, vehicle 100 utilizes an onboard fuel cell (e.g., a SOFC) which utilizes a locally stored hydrogen fuel source (e.g., kerosene) and a locally stored oxygen fuel source (e.g., liquefied oxygen) to allow for long duration under water missions without surfacing.

Figure 2:
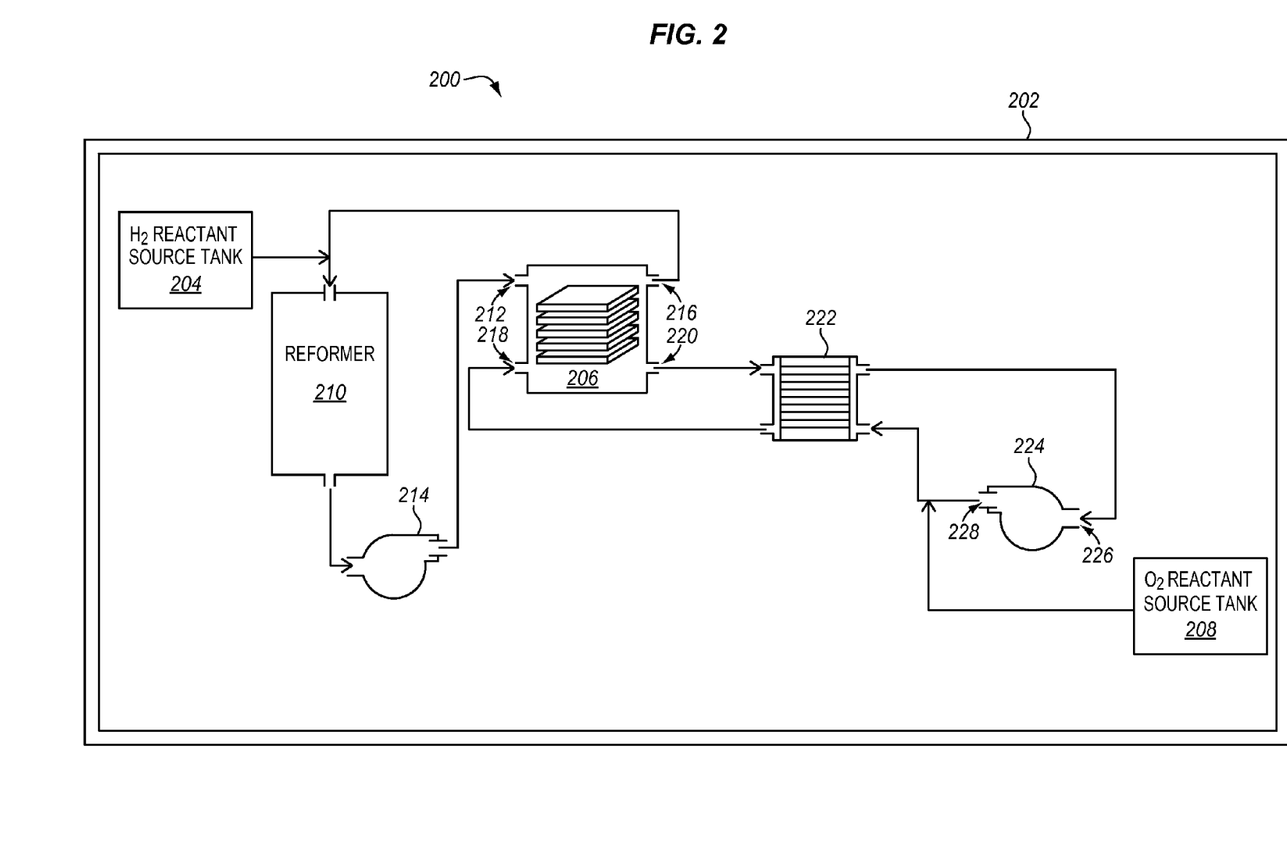
FIG. 2 illustrates a fuel cell system in an exemplary embodiment.

FIG. 2 illustrates a fuel cell system 200 in an exemplary embodiment. In this embodiment, fuel cell system 200 is illustrated as a SOFC fuel cell system, but one skill in the art will understand that fuel cell system 200 may be implemented as a PEM fuel cell system in other embodiments. Fuel cell system 200 may be implemented within a pressure hull 202 of submersible vehicles (e.g., vehicle 100). Fuel cell system 200 is a simplified representation, and one skilled in the art will understand that additional components (e.g., valves, coolant loops, blowers, etc.), not shown, may be utilized as a matter of design choice. Further, the various elements illustrated in FIG. 2 may not necessarily be present in PEM fuel cell embodiments.

In FIG. 2, an $H_2$ reactant source tank 204 provides a fuel to a fuel cell 206 (e.g., a SOFC fuel cell), and an $O_2$ reactant source tank 208 provides a source of $O_2$ to fuel cell 206. The fuel is combined with the $O_2$ within fuel cell 206 and is oxidized to generate electricity. The fuel may include any type of hydrogen-based fuel as a matter of design choice (e.g., $H_2$), although heavy hydrocarbon fuels may be used due to their higher energy density. Some examples of heavy-hydrocarbon fuels are alcohols, gasoline, diesel, and jet fuel (e.g., kerosene). When heavy-hydrocarbon fuels are used, a fuel reformer 210 is used to generate free $H_2$ for use by fuel cell 206, which is provided to the anode side of fuel cell 206 (e.g., via an anode inlet 212) by an anode blower 214. Un-oxidized $H_2$ and water exit fuel cell 206 (e.g., via an anode outlet 216) and are returned to reformer 210. An anode purge system (not shown) removes generated $H_2O$ and $CO_2$.

The source of $O_2$ may be an oxidizer, a highly compressed $O_2$, or liquefied $O_2$ as a matter of design choice. Liquefied $O_2$ provides a higher density, which results in a longer mission time for submersible vehicles. $O_2$ is provided to the cathode side of fuel cell 206 (e.g., via cathode inlet 218) by a cathode blower 224. An outlet 228 of cathode blower 224 may be fed to a heat exchanger 222 to pre-heat the oxygen that is fed to fuel cell 206. Heat exchanger 222 has a hot side tied to a cathode outlet 220 of fuel cell 206, which is at a high temperature. The exhaust of the hot side of heat exchanger 222 is routed back to an inlet 226 of cathode blower 224.

During operation of fuel cell system 200, the contents of $H_2$ reactant source tank 204 and $O_2$ reactant source tank 208 are consumed to generate electricity and eventually will be refilled. However, accessing $H_2$ reactant source tank 204 and $O_2$ reactant source tank 208 via a penetration through pressure hull 202 may introduce a point of failure in pressure hull 202. In some cases, it may be more prudent to disassemble portions of pressure hull 202 in order to refill $H_2$ reactant source tank 204 and $O_2$ reactant source tank 208 rather than risk a breach in pressure hull 202 while the submersible vehicle is at depth. Submersible vehicles that utilize fuel cells can be incredibly complex and expensive devices, and losing such a vehicle to a breach in pressure hull 202 may simply be an unacceptable risk.

In the embodiments described herein, vehicle 100 (see FIG. 1) utilizes a pressure hull penetrator that can reliably penetrate a pressure hull for vehicle 100 while maintaining the pressure integrity of the pressure hull. Use of the pressure hull penetrator for vehicle 100 allows the onboard reactant sources for the fuel cell of vehicle 100 to be quickly replenished while minimizing the risks in introducing a potential point of failure in the pressure hull for vehicle 100.

Figure 3:
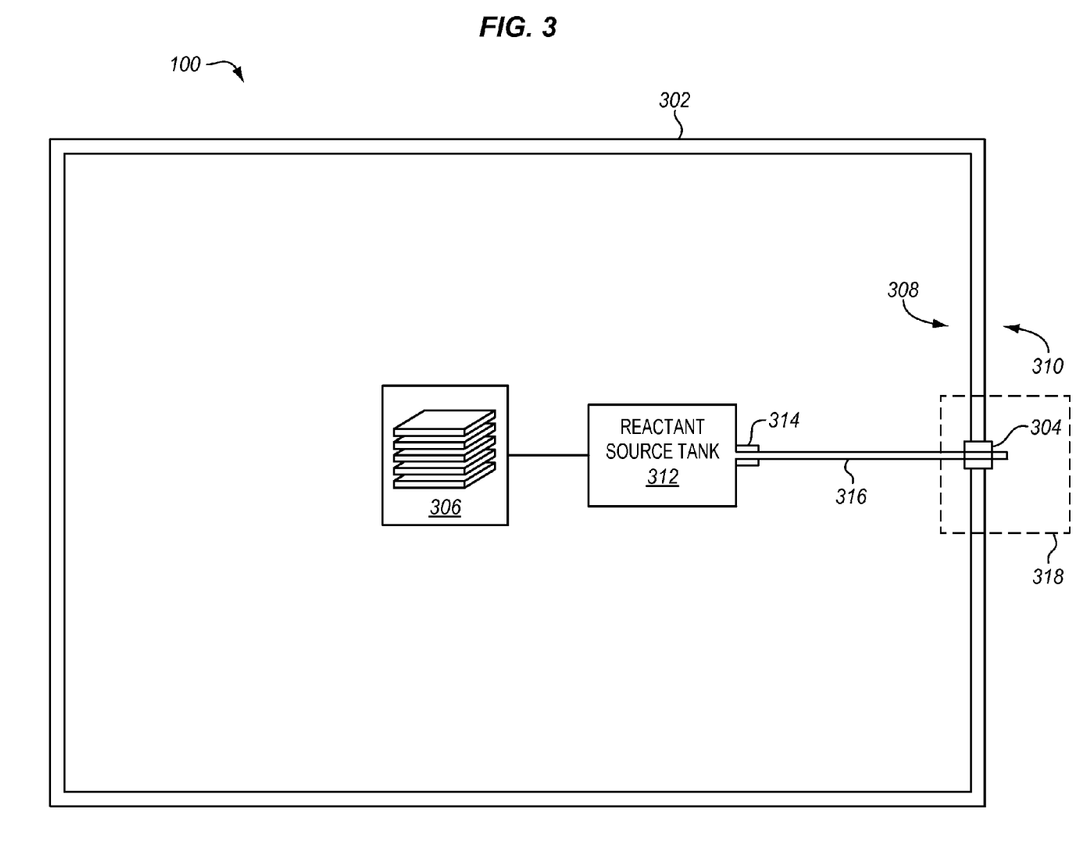
FIG. 3 illustrates a pressure hull for the vehicle of FIG. 1 that includes a pressure hull penetrator for refueling of a fuel cell in an exemplary embodiment.

FIG. 3 illustrates a pressure hull 302 for vehicle 100 of FIG. 1 that includes a pressure hull penetrator 304 for refueling of a fuel cell 306 (e.g., a SOFC or a PEM fuel cell) in an exemplary embodiment. In this embodiment, pressure hull 302 includes an interior surface 308 and an exterior surface 310. Exterior surface 310 may be subject to high pressures as vehicle 100 dives to various depths under water. Yet, many of the internal systems of vehicle 100 are not rated for such pressures and therefore, one purpose of pressure hull 302 is to ensure that the pressure inside of pressure hull 302 (e.g., systems within interior surface 308 of pressure hull 302) is kept relatively low (e.g., near atmospheric pressure).

In this embodiment, vehicle 100 includes a reactant source tank 312 which stores a source of reactants for fuel cell 306. As used herein, reactants may include hydrogen, oxygen, and/or sources of hydrogen and oxygen. For instance, tank 312 may store kerosene, which is reformed utilizing a fuel reformer (not shown in FIG. 3) into $H_2$ and supplied to fuel cell 306. Tank 312 may store an oxidizer or some other source of oxygen for fuel cell 306. Tank 312 includes a fill port 314 which allows a source of reactants for fuel cell 306 to be transferred into tank 316 via a fill tube 316. Fill port 314 may include one or more valves that actuate during the refueling process to enable reactants or sources of reactants to be transferred into or out of tank 312 along fill tube 316.

Fill tube 316 in this embodiment couples to fill port 314 of tank 312 and passes through pressure hull penetrator 304 to exterior surface 310 of pressure hull 302. In some embodiments, fill tube 316 and/or pressure hull penetrator 304 may comprise a metal material (e.g., stainless steel). A more detailed view of a region 318 near where pressure hull penetrator 304 traverses pressure hull 302 will be illustrated in FIG. 4.

Figure 4:
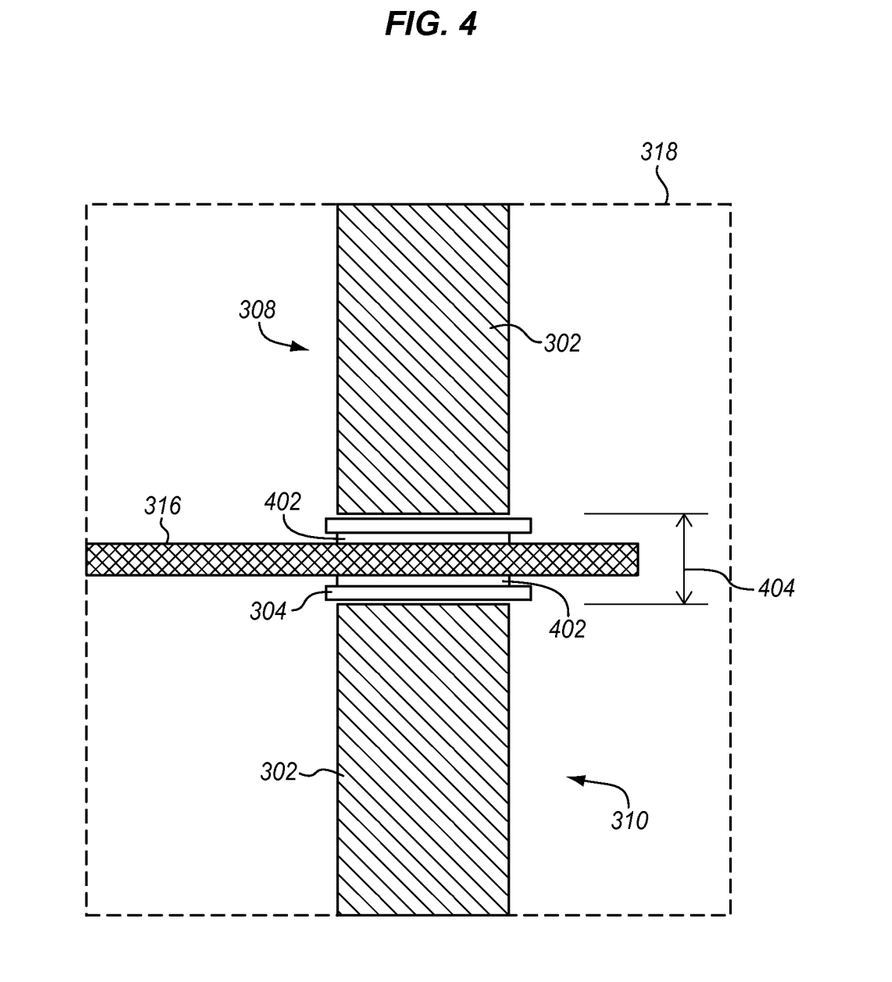
FIG. 4 illustrates a cross-sectional view of a region where the pressure hull penetrator traverses through a pressure hull in an exemplary embodiment.

FIG. 4 illustrates a cross-sectional view of region 318 where pressure hull penetrator 304 traverses through pressure hull 302 in an exemplary embodiment. In this view, pressure hull penetrator 304 traverses pressure hull 302 within a passage 404 through pressure hull 302. Fill tube 316 traverses through pressure hull penetrator 304, and is surrounded by an electrically non-conducting sleeve 402 that is sandwiched between fill tube 316 and pressure hull penetrator 304. Sleeve 402 electrically isolates fill tube 316 from pressure hull penetrator 304, and may be formed from a Polytetrafluoroethylene (PTFE) material in some embodiments. Sleeve 402 prevents an electrical connection from occurring between fill tube 316 and pressure hull 302. Since fill tube 316 is mechanically coupled to tank 312, an electrical connection between fill tube 316 and pressure hull 302 may damage internal systems of vehicle 100 due to the voltages that may be induced by fuel cell 306 onto pressure hull 302 during underwater operation.

Figure 5:
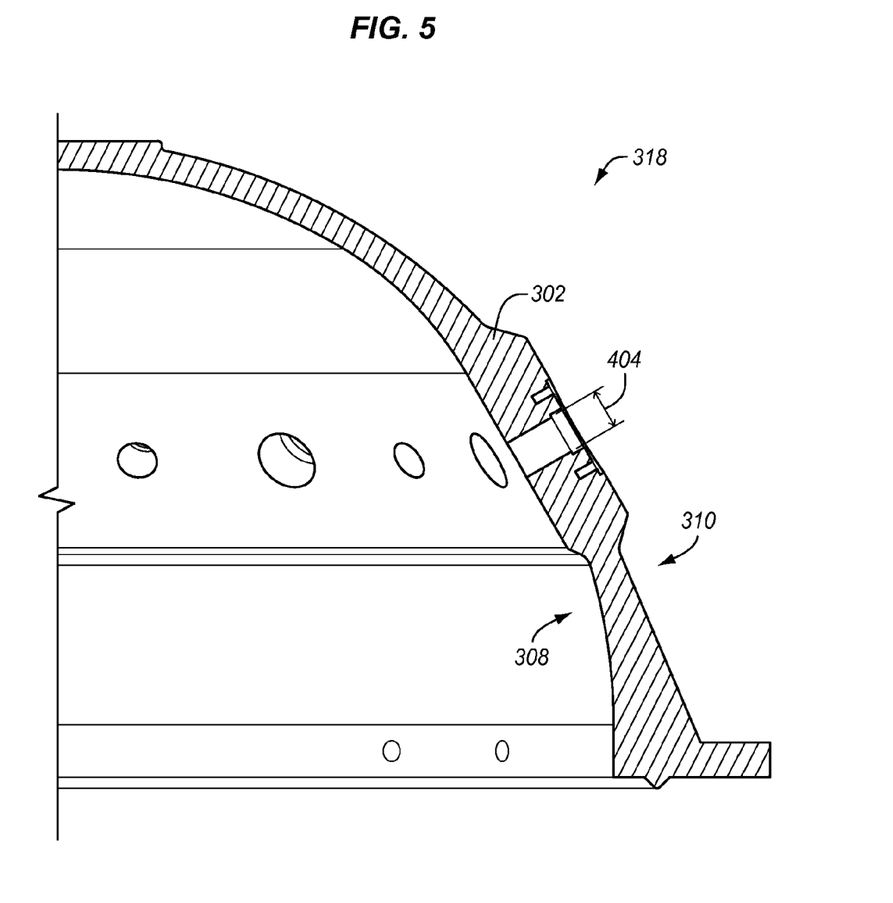
FIGS. 5-11 illustrate cross-sectional views of the region where the pressure hull penetrator traverses through a pressure hull in various exemplary embodiments.
Figure 6:
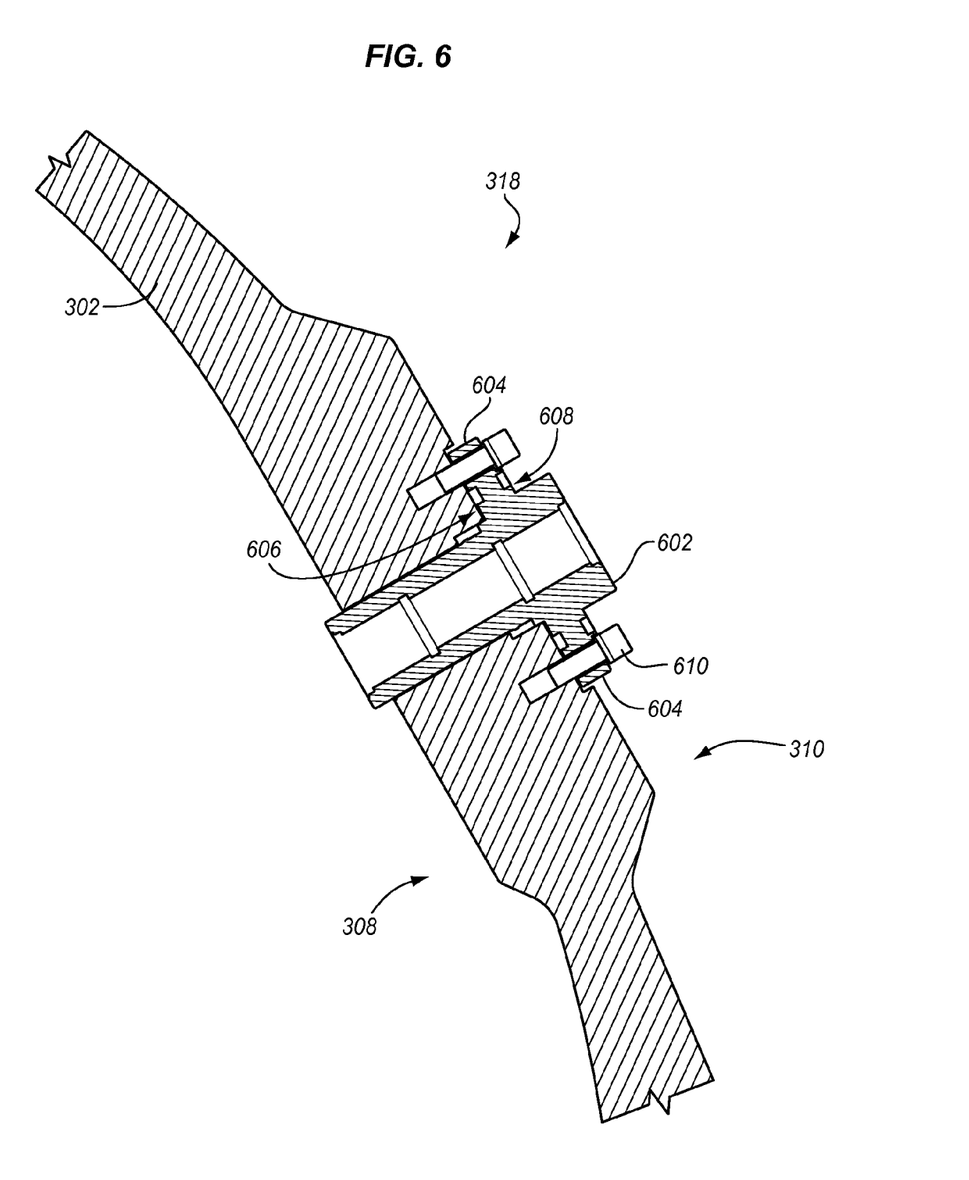

FIGS. 5-11 illustrate cross-sectional views of region 318 where a pressure hull penetrator traverses through a pressure hull in various exemplary embodiments. FIG. 5 illustrates that pressure hull 302 has passage 404 that traverses through pressure hull 302 from exterior surface 310 to interior surface 308. FIG. 6 illustrates pressure hull penetrator 602 removably mounted to exterior surface 310 of pressure hull 302 utilizing a circular flange 604, although one skilled in the art will recognize that any number of functionally equivalent features may be used to mount pressure hull penetrator 602 to pressure hull 302.

In FIG. 6, flange 604 includes a first surface 606 which mates to exterior surface 310 of pressure hull 302 and a second surface 608 which is disposed away from external surface 310 of pressure hull 302. FIG. 6 also illustrates a number of fasteners 610 which are able to removably mount pressure hull penetrator 602 to pressure hull 302.

Figure 7:
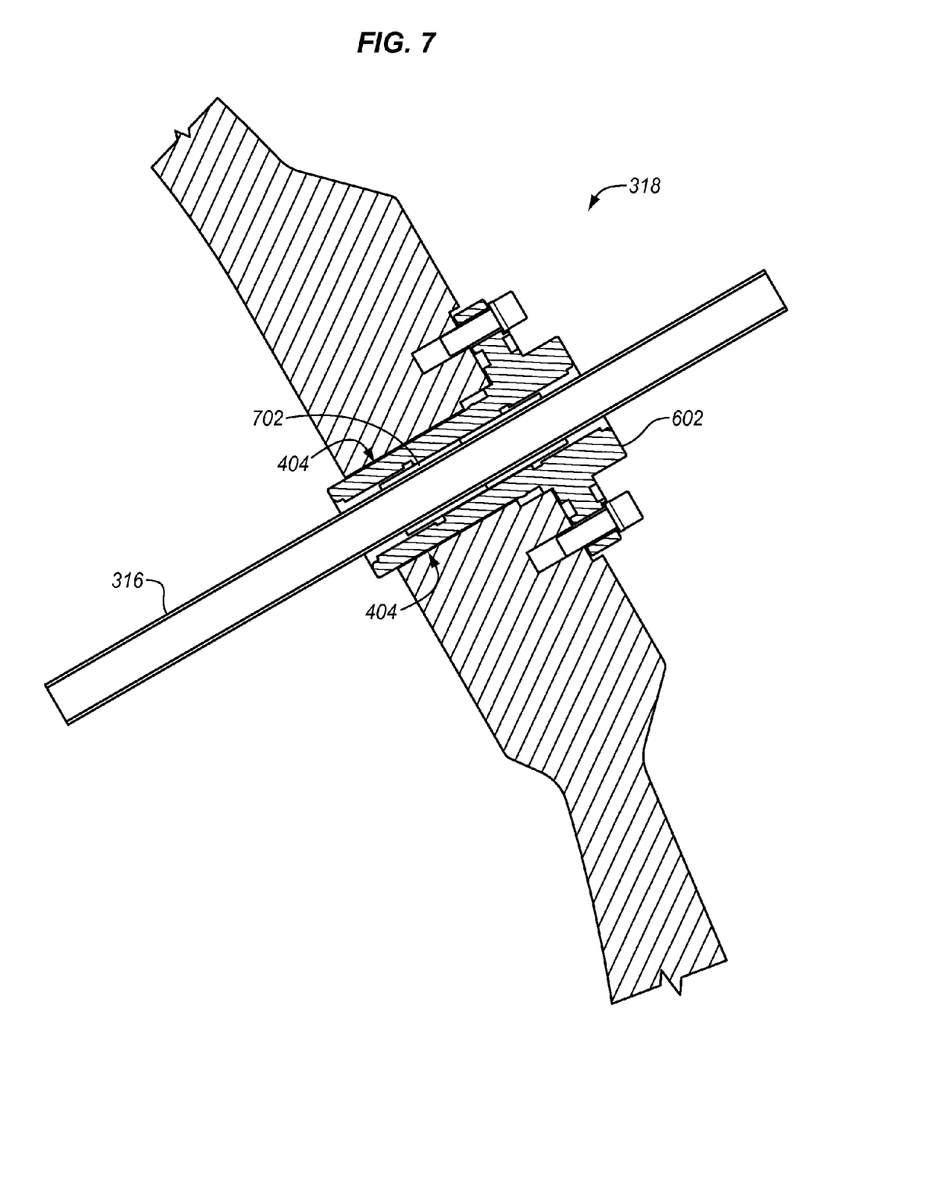

In FIG. 7, an electrically non-conductive sleeve 702 surrounds fill tube 316 and is sandwiched between fill tube 316 and pressure hull penetrator 602 along passage 404. Sleeve 702 electrically isolates fill tube 316 from pressure hull 302, which prevents an electrical connection between pressure hull 302 and internal systems of vehicle 100 (e.g., fuel cell 306). In some embodiments, sleeve 702 is formed from a PTFE material. In addition to being electrically non-conductive, sleeve 702 is capable of withstanding potentially cryogenic temperatures in cases where reactant source tank 312 stores liquefied reactants (e.g., liquefied oxygen).

Figure 8:
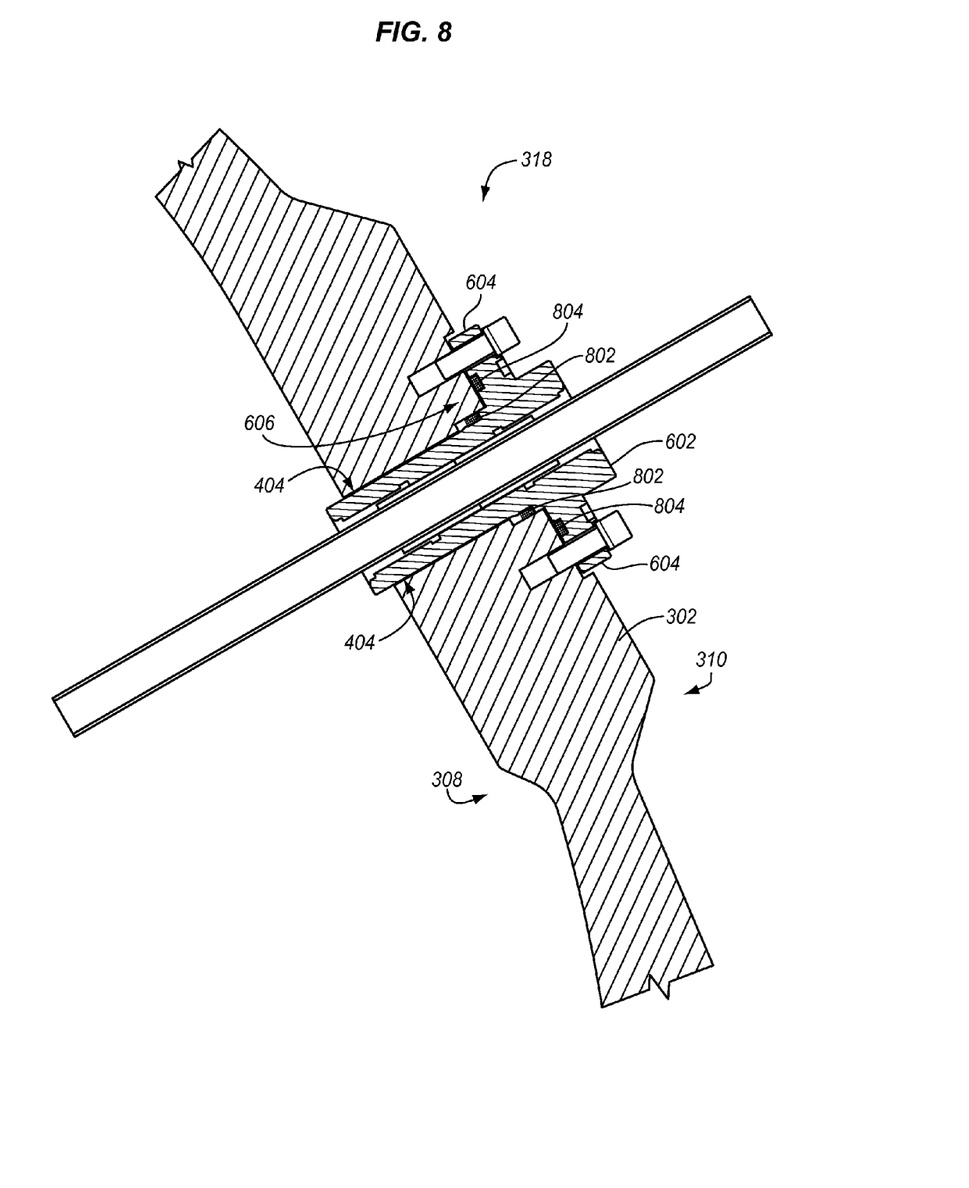

In FIG. 8, a radial seal 802 is illustrated that is sandwiched between pressure hull penetrator 602 and passage 404. Radial seal 802 is utilized to prevent a pressure leak between passage 404 and pressure hull penetrator 602 along passage 404. Also illustrated in FIG. 8 is a face seal 804 that is sandwiched between surface 606 of flange 604 and exterior surface 310 of pressure hull 302. Face seal 804 is utilized to prevent a pressure leak between exterior surface 310 of pressure hull 302 and flange 604, and works in conjunction with radial seal 802 to ensure that a pressure boundary between exterior surface 310 and interior surface 308 across pressure hull 302 is maintained.

In some embodiments, radial seal 802 and/or face seal 804 include spring type seals, which are capable of providing an outward force towards a mating surface in order to ensure an effective and reliable sealing capability. In some embodiments, radial seal 802 and/or face seal 804 may comprise a PTFE material. In addition to being electrically non-conductive, PTFE is capable of withstanding potentially cryogenic temperatures.

Figure 9:
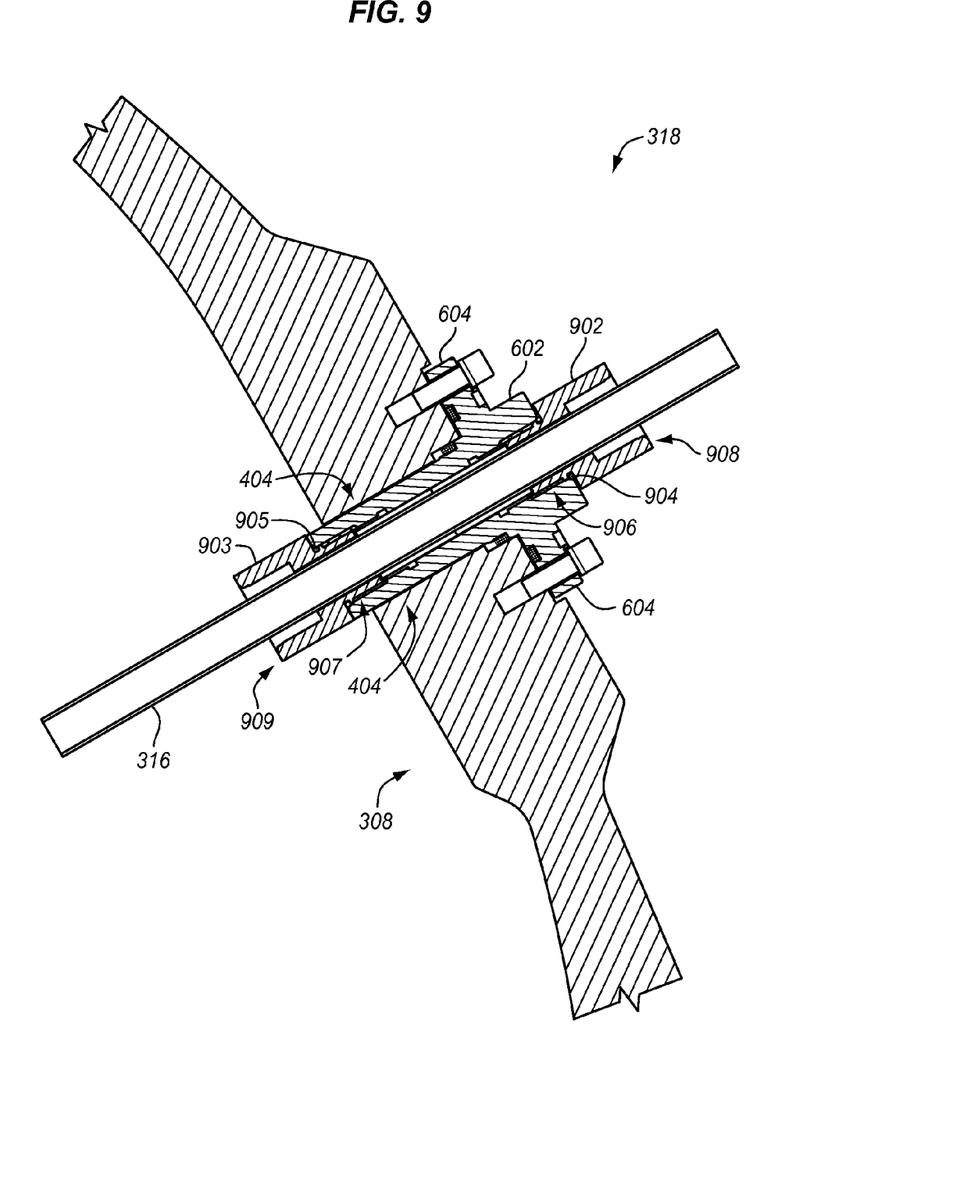

In FIG. 9, a first non-conductive end fitting 902 surrounds fill tube 316 and has a first end 906 and a second end 908. End 906 is removably coupled to pressure hull penetrator 602 proximate to flange 604. For instance, end 906 of end fitting 902 may screw on pressure hull penetrator 602. End fitting 902 may include a first O-ring 904 that forms a seal between end 906 and pressure hull penetrator 602 proximate to flange 604.

A second non-conductive end fitting 903 surrounds fill tube 316 and has a first end 907 and a second end 909. End 907 is removably coupled to pressure hull penetrator 602 proximate to an intersection between interior surface 308 of pressure hull 302 and passage 404 through pressure hull 302. For instance, end 907 of end fitting 903 may screw onto pressure hull penetrator 602. End fitting 903 may include a second O-ring 905 that forms a seal between end 907 and pressure hull penetrator 602. End fittings 902-903 and/or O-rings 904-905 may comprise PTFE material in some embodiments.

Figure 10:
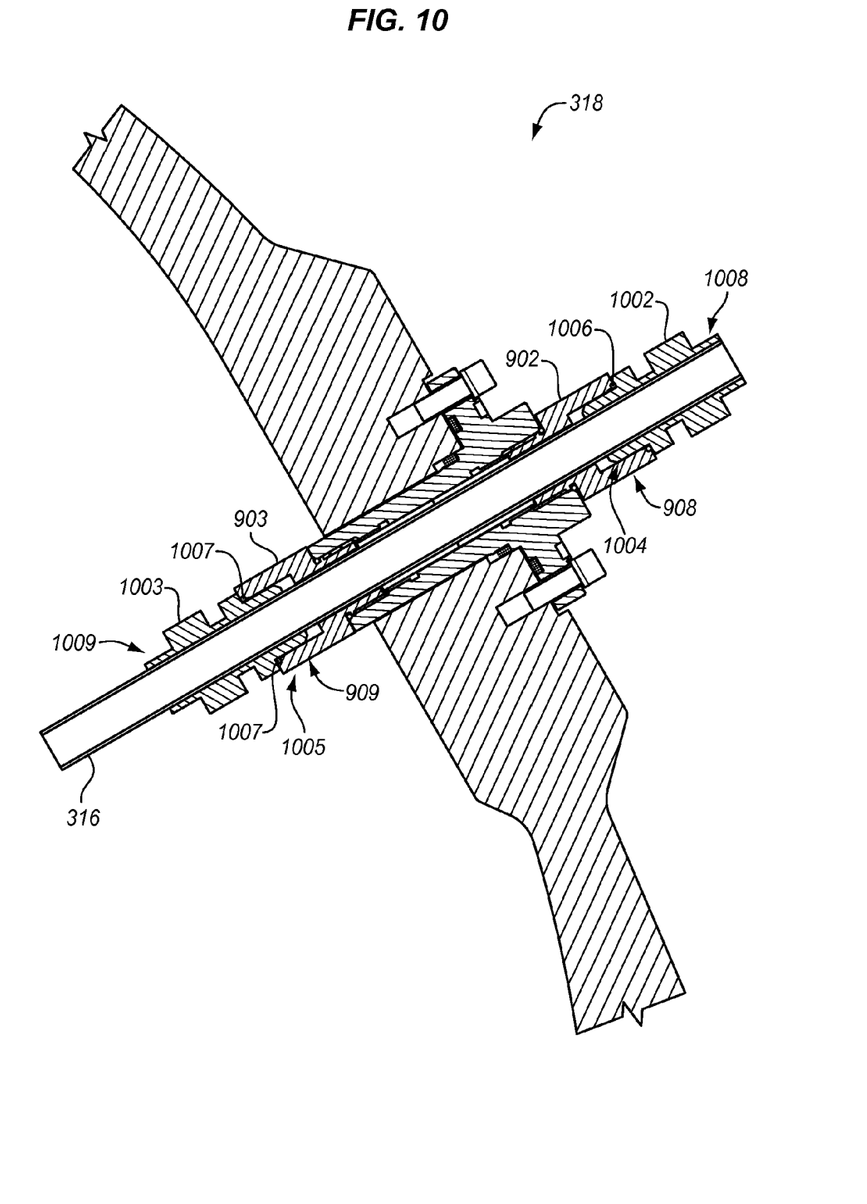

In FIG. 10, a first metal tube fitting 1002 surrounds fill tube 316, and has a first end 1004 that is removably coupled to end 908 of end fitting 902. For instance, metal tube fitting 1002 may screw onto end 908 of end fitting 902. A first O-ring 1006 may be used to form a seal between end 1004 of metal tube fitting 1002 and end fitting 902. A second end 1008 of metal tube fitting 1002 mechanically clamps to fill tube 316 and forms a seal between metal tube fitting 1002 and fill tube 316. O-rings 1006-1007 may comprise PTFE material in some embodiments A second metal tube fitting 1003 surrounds fill tube 316, and has a first end 1005 that is removably coupled to end 909 of end fitting 903. For instance, metal tube fitting 1003 may screw onto end 909 of end fitting 903. A second O-ring 1007 may be used to form a seal between end 1005 of metal tube fitting 1003 and end fitting 903. A second end 1009 mechanically clamps to fill tube 316 and forms a seal between metal tube fitting 1003 and fill tube 316.

Figure 11:
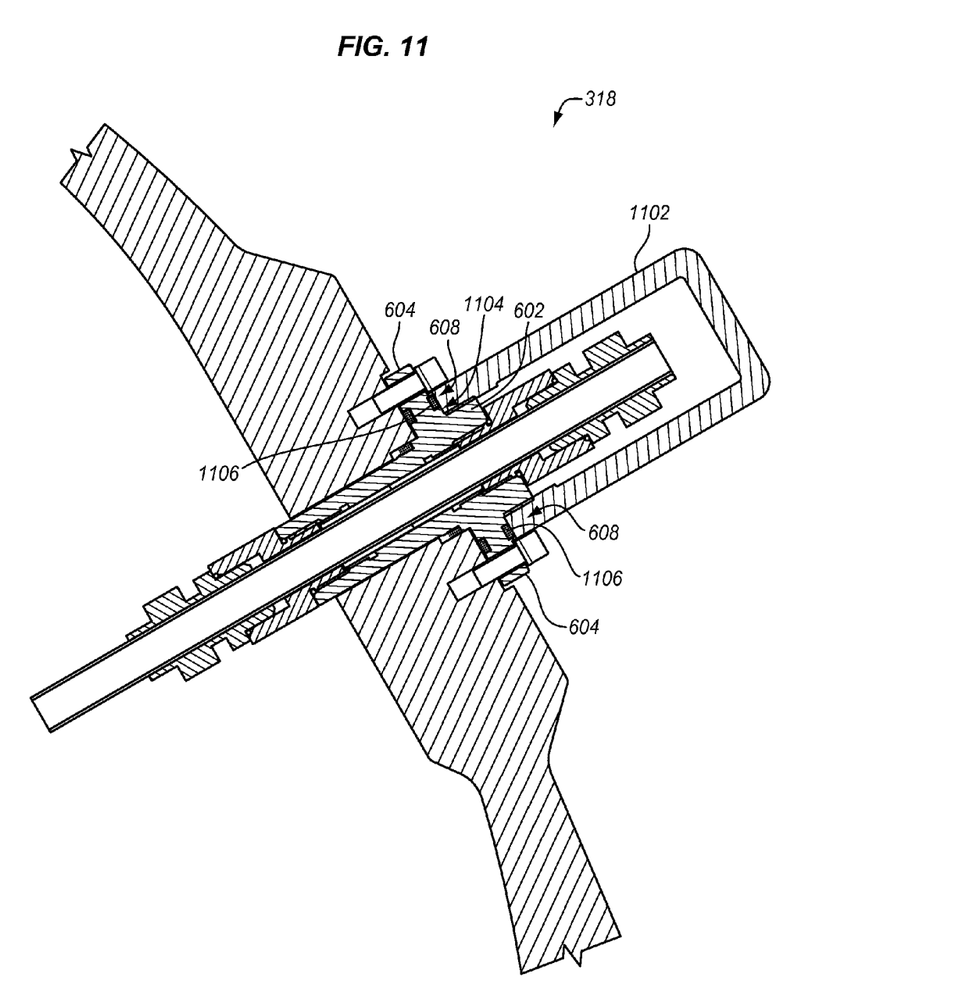

In FIG. 11, an open end of a pressure cap 1102 mates with surface 608 of flange 604 along a circular lip 1104. Pressure cap 1102 may include threads along a portion of the open end, which allows pressure cap 1102 to screw onto pressure hull penetrator 602 and compress a face seal 1106 between surface 608 of flange 604 and circular lip 1104 of pressure cap 1102. Pressure cap 1102 is removably coupled to flange 604 to allow access to fill tube 316. During underwater operation, pressure cap 1102 provides electrical isolation between metal tube fitting 1002 and the underwater environment. Face seal 1106 may comprise a spring type face seal and/or may comprise a PTFE material in some embodiments.

Utilizing the pressure hull penetrators described herein, a pressure hull for a submersible vehicle can be reliably penetrated to allow for a refueling of reactants for a fuel cell utilized by the vehicle while maintaining the pressure integrity of the pressure hull for the vehicle. The pressure hull penetrators include non-conductive elements, which prevents inadvertent electrical coupling between the internal systems of the vehicle and the pressure hull along the fill tube, which improves the reliability of the vehicle.

Although specific embodiments were described herein, the scope is not limited to those specific embodiments. Rather, the scope is defined by the following claims and any equivalents thereof.

The invention claimed is:

1. An apparatus comprising:
a vehicle that is configured to submerge in water, the vehicle comprising:
a pressure hull configured to maintain a pressure boundary between an interior surface and an exterior surface;
a fuel cell within the interior surface;
a reactant source tank for the fuel cell within the interior surface that includes a fill port for transferring a reactant source for the fuel cell to the reactant source tank;
a pressure hull penetrator that traverses from the exterior surface to the interior surface utilizing a passage through the pressure hull, wherein the pressure hull penetrator is configured to maintain the pressure boundary between the exterior surface and the interior surface;
a fill tube coupled to the fill port of the reactant source tank that traverses through the pressure hull penetrator to the exterior surface; and
an electrically non-conductive sleeve surrounding the fill tube that is sandwiched between the fill tube and the pressure hull penetrator along the passage through the pressure hull.

2. The apparatus of claim 1 wherein:
the pressure hull penetrator includes a flange that removably couples the pressure hull penetrator to the pressure hull, wherein the flange includes a first surface that mates to the exterior surface of the pressure hull and a second surface disposed away from the exterior surface of the pressure hull.

3. The apparatus of claim 2 further comprising:
a radial seal sandwiched between the passage through the pressure hull and the pressure hull penetrator; and
a face seal sandwiched between the first surface of the flange and the exterior surface of the pressure hull.

4. The apparatus of claim 3 wherein:
the radial seal and the face seal comprise spring type seals.

5. The apparatus of claim 3 further comprising:
a pressure cap having an open end with a circular lip and a closed end, wherein the open end is removably coupled to the pressure hull penetrator; and
a face seal sandwiched between the circular lip and the second surface of the flange.

6. The apparatus of claim 3 wherein:
a material of the radial seal and the face seal comprises Polytetrafluoroethylene (PTFE).

7. The apparatus of claim 3 further comprising:
a first non-conductive end fitting surrounding the fill tube that has a first end and a second end, wherein the first end is removably coupled with the pressure hull penetrator proximate to the flange;
a second non-conductive end fitting surrounding the fill tube that has a first end and a second end, wherein the first end is removably coupled with the pressure hull penetrator proximate to an intersection between the interior surface of the pressure hull and the passage through the pressure hull.

8. The apparatus of claim 7 wherein:
a material of the first and second non-conductive end fittings comprises Polytetrafluoroethylene (PTFE).

9. The apparatus of claim 7 further comprising:
a first O-ring seal sandwiched between the first end of the first non-conductive end fitting and the pressure hull penetrator; and
a second O-ring seal sandwiched between the first end of the second non-conductive end fitting and the pressure hull penetrator.

10. The apparatus of claim 9 wherein:
a material of the first and second O-ring seals comprises Polytetrafluoroethylene (PTFE).

11. The apparatus of claim 7 further comprising:
a first metal tube fitting surrounding the fill tube having a first end that is removably coupled with the second end of the first non-conductive end fitting, and having a second end that is configured to mechanically clamp to the fill tube to form a seal between the first metal tube fitting and the fill tube; and
a second metal tube fitting surrounding the fill tube having a first end that is removably coupled with the second end of the second non-conductive end fitting, and having a second end that is configured to mechanically clamp to the fill tube to form a seal between the second metal tube fitting and the fill tube.

12. The apparatus of claim 11 further comprising:
a first O-ring seal sandwiched between the first end of the first metal tube fitting and the second end of the first non-conductive end fitting; and
a second O-ring seal sandwiched between the first end of the second metal tube fitting and the second end of the second non-conductive end fitting.

13. The apparatus of claim 1 wherein the fuel cell comprises a Solid Oxide Fuel Cell (SOFC) or a Proton Exchange Membrane (PEM) fuel cell.

14. The apparatus of claim 1 wherein the reactant source for the fuel cell comprises an oxidizer or a hydrocarbon fuel.

15. The apparatus of claim 14 wherein the oxidizer comprises liquefied oxygen.

16. The apparatus of claim 14 wherein the hydrocarbon fuel comprises kerosene.

17. The apparatus of claim 1 wherein a material of the pressure hull penetrator and the fill tube comprises metal.

18. The apparatus of claim 1 wherein a material of the electrically non-conductive sleeve comprises Polytetrafluoroethylene (PTFE).

19. An apparatus comprising:
an electrically conductive pressure hull penetrator that traverses from an exterior surface of a pressure hull for a submersible vehicle to an interior surface of the pressure hull utilizing a passage through the pressure hull;
wherein the pressure hull penetrator includes a flange that removably couples the pressure hull penetrator to the pressure hull along a surface that mates to the exterior surface of the pressure hull;
an electrically conductive fill tube coupled to a reactant source tank for a fuel cell that traverses through a centerline of the pressure hull penetrator to the exterior surface;
an electrically non-conductive sleeve that is sandwiched between the fill tube and the pressure hull penetrator along the passage through the pressure hull;
a radial seal sandwiched between the passage through the pressure hull and the pressure hull penetrator; and a face seal sandwiched between the surface of the flange and the exterior surface of the pressure hull.

20. An apparatus comprising:

an electrically conductive pressure hull penetrator that traverses from an exterior surface of a pressure hull to an interior surface of the pressure hull utilizing a passage through the pressure hull;

wherein the pressure hull penetrator includes a mounting surface that removably couples the pressure hull penetrator to the pressure hull;

an electrically conductive fill tube coupled to a storage tank that traverses through a centerline of the pressure hull penetrator to the exterior surface;

an electrically non-conductive sleeve that is sandwiched between the fill tube and the pressure hull penetrator along the passage through the pressure hull;

a radial seal sandwiched between the passage through the pressure hull and the pressure hull penetrator; and a face seal sandwiched between the mounting surface of the pressure hull penetrator and the exterior surface of the pressure hull.

* * * * *